United States Patent [19]

Kromer

[11] 3,916,846
[45] Nov. 4, 1975

[54] SIDE INTAKE FOR A ROTARY INTERNAL COMBUSTION ENGINE

[75] Inventor: Gunter Kromer, Heilbronn, Germany

[73] Assignees: Audi NSU Auto Union Aktiengesellschaft, Neckarsulm; Wankel G.m.b.H., Lindua, Bodensee, both of Germany

[22] Filed: May 30, 1974

[21] Appl. No.: 474,667

[30] Foreign Application Priority Data
July 18, 1973 Germany............................ 2336489

[52] U.S. Cl.................................. 123/8.45; 123/108
[51] Int. Cl.² ........................................ F02B 53/06
[58] Field of Search.................. 123/8.01, 8.45, 108; 418/61 A

[56] References Cited
UNITED STATES PATENTS

| | | |
|---|---|---|
| 794,859 | 7/1905 | Gosse.................................. 123/108 |
| 892,255 | 6/1908 | Hartje.............................. 123/108 X |
| 1,247,548 | 11/1917 | Kolarik................................ 123/108 |
| 3,362,385 | 1/1968 | Soubis..................................... 418/1 |
| 3,412,716 | 11/1968 | Tausch et al. ..................... 123/8.45 |

*Primary Examiner*—C. J. Husar
*Assistant Examiner*—Michael Koczo, Jr.
*Attorney, Agent, or Firm*—Arthur Frederick; Victor D. Behn

[57] ABSTRACT

In a rotary internal combustion engine having a passageway for conducting a fuel and air mixture to a side intake port in the housing end wall, the improvement comprises a variable throttle valve means disposed upstream from and closely adjacent the intake port for accelerating the flow of fuel and air mixture and creating thereby a turbulent flow between the throttle valve means and the intake port whereby entrained liquid fuel droplets are comminuted and thus are more readily vaporizable.

4 Claims, 2 Drawing Figures

SIDE INTAKE FOR A ROTARY INTERNAL COMBUSTION ENGINE

The invention relates to rotary internal combustion engines and, more particularly, to an improved fuel and air intake means for such engines.

BACKGROUND

In rotary internal combustion engines of the Wankel type, such as disclosed in the patent to Wankel et al., U.S. Pat. No. 2,988,065, a rotor having a plurality of contiguous flank portions is supported for planetary rotation in a housing cavity which cavity is defined by at least two wall sections and an intermediate peripheral wall section having a multi-lobe inner peripheral surface. The rotor and housing define therebetween a plurality of working chambers which successively expand and contract in volumetric size as the rotor rotates within the housing cavity. To provide a combustible fuel mixture in each of the working chambers of such an engine, a fuel and air intake means is provided in at least one of the wall sections to conduct a fuel and air mixture from a source thereof into each of the working chambers. The intake means usually consists of an intake passageway which communicates at one end with a source of fuel and air mixture, such as a carburetor or a fuel injector, and at the other end terminates at an intake port. As is well known in side-ported rotary engines of the Wankel type, the rotor in its rotation opens and closes the intake port to effect successive communication of the working chambers with the intake passageway and terminate such communications. This control of the fluid flow through a side intake port is fully disclosed in the patent to Price et al. U.S. Pat. No. 3,103,208.

In rotary internal combustion engines as herein described, it has been found difficult to achieve a desired uniformly vaporized mixture of fuel and air entering the working chambers through the intake port. One reason for this difficulty is that entrained droplets of liquid fuel are not vaporized and enter the working chamber as liquid particles. Another reason for failing to achieve a desired vaporized fuel and air mixture is attributed to the fact that the suction passageways leading to the side intake ports are relatively long and therefore some of the liquid fuel particles disentrain and flow along the surface of the suction passageway while some of the vaporized fuel may condense on the surface of the intake passageway. Also, at least some of the liquid fuel is re-entrained and is carried as droplets into the working chambers. The present invention is therefore directed to overcome the disadvantages of existing side ported rotary internal combustion engines.

Accordingly, it is an object of the present invention to provide an improved side intake means for rotary internal combustion engines which provides for improved fuel and air mixture passing into the working chambers.

Another object of this invention is to provide an improved side intake means for rotary internal combustion engines which minimizes entrained liquid fuel droplets passing into the working chambers.

A further object of the present invention is to provide an improved side intake means for a rotary internal combustion engine which achieves comminution and evaporation of entrained fuel droplets.

SUMMARY

It is therefore contemplated by the present invention to provide an improved side intake port means for a rotary internal combustion engine of the type wherein a rotor is supported for planetary rotation within a housing cavity defined by two spaced wall sections and an intermediate peripheral wall section having a multi-lobe inner peripheral surface, the rotor having a plurality of contiguous flank portions so that the rotor defines with the housing walls a plurality of working chambers which expand and contract in volumetric size as the rotor rotates within the housing cavity.

The improved side intake port means comprises an intake passageway extending in at least one of the two wall sections of the housing and communicating at one end with a source of fuel and air, such as a carburetor or fuel injector, and at the other end with a side intake port and a throttling means disposed adjacent to and upstream of the side intake port. The throttling means includes means for increasing the velocity of flow of the fuel and air mixture and producing a turbulent flow which comminutes the entrained liquid fuel droplets and effects vaporization of the comminuted liquid fuel.

More specifically, the invention contemplates a throttling means which comprises a fixed member disposed adjacent to and upstream from the intake port and an axially slidable sleeve disposed within the intake passageway with one end adjacent the fixed member. The fixed member and the one end of the sleeve coact to define therebetween a restricted flow area which effects substantial acceleration of the fuel and air mixture flowing therethrough. The throttle means also includes actuating means for effecting axial movement of the sleeve in response to actuation of an engine speed control device, such as the accelerator pedal of a vehicle. By thus varying the flow area of the restricted flow area, the throttle means of this invention serves the same function as the ordinary throttle-flap type control or butterfly valve for regulating engine speed.

In a still narrower aspect of the invention the throttle means comprises a tubular sleeve, one end of which coacts with a stationary cone-shaped fixed member to define therebetween a substantially annular throttling gap of relatively narrow width and of relatively long length.

BRIEF DESCRIPTION OF THE DRAWINGS

The aforementioned objectives and other objectives and advantages of the present invention will appear more fully hereinafter from a consideration of the detailed description which follows when taken together with the accompanying drawings wherein one embodiment of the invention is illustrated and in which.

DESCRIPTION OF PREFERRED EMBODIMENT

Figure 2:
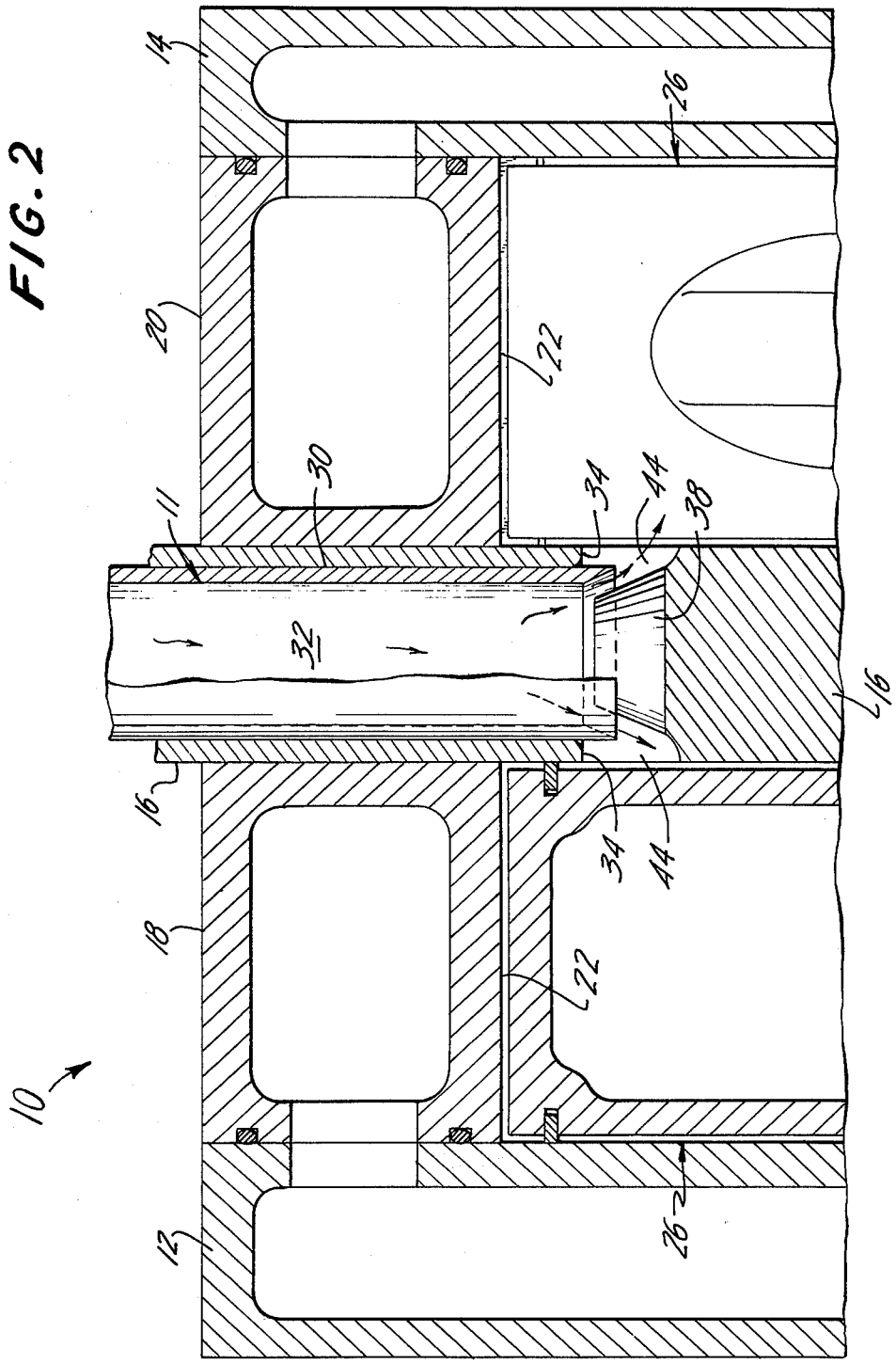
FIG. 2 is a fragmentary cross-sectional view of a two rotor rotary internal combustion engine having an improved fuel and air side intake according to this invention.

Now referring to the drawings and more specifically to FIG. 2, the reference number 10 designates a rotary internal combustion engine of the multi-rotor type which has an improved fuel and air side intake 11 according to this invention. While the invention will be described as applied to a two-rotor rotary internal combustion engine, the invention is not limited to such application. The invention may be applied to a rotary internal combustion engine having one rotor or more than two rotors without departure from the scope and spirit of this invention.

Figure 1:
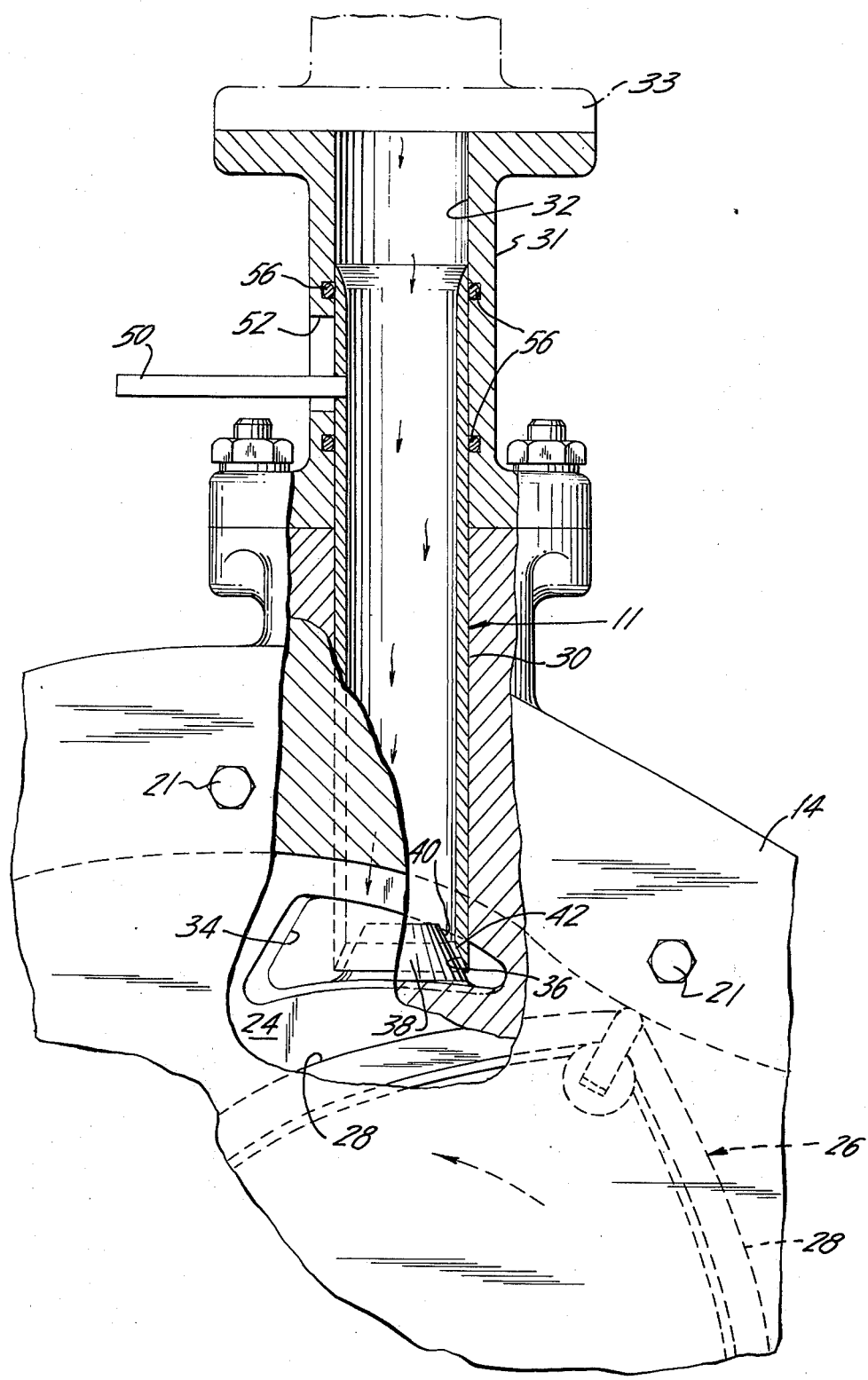
FIG. 1 is a fragmentary side view of the rotary internal combustion engine shown in FIG. 2, on a somewhat smaller scale and with parts broken away to show the fuel and air side intake of this invention.

The rotary internal combustion engine 10 may be of the Wankel type having a housing comprising opposite end wall sections 12 and 14, an intermediate wall section 16, and a peripheral wall section 18 and 20 disposed between the intermediate wall section 16 and the respective end wall sections 12 and 14. The wall sections 12, 14, 16, 18 and 20 are suitably secured together by any conventional means, such as tie-bolts 21 (only two of which are shown in FIG. 1), to form a unitary structure. Each of the intermediate wall sections 18 and 20, may have an inner peripheral surface 22 of multi-lobe configuration so that two multi-lobe cavities 24 are defined between wall sections 12, 14, 16, 18 and 20 on opposite sides of intermediate wall section 16. In each housing cavity 24 is eccentrically supported a rotor 26 which has a plurality of contiguous flank portions 28. Each rotor 26 defines with its associated wall sections 12, 14, 16, 18 and 20 a plurality of working chambers which successively expand and contract in volumetric size as the rotor planetates within cavity 24. The engine 10 is provided with means (not shown) for igniting a combustible mixture introduced in each of the working chambers and an exhaust outlet means (not shown) for discharging spent combustion products from each of the working chambers. To provide for the introduction of a combustible mixture of fuel and air into the working chambers at the proper time, fuel and air intake means 11 according to this invention is provided in intermediate wall section 16.

The fuel and air intake means 11 basically includes a variable throttle valve means disposed in an intake passageway and adjacent to and upstream from a side intake port with which the suction passageway communicates. The intake passageway may include a connector element 31 and a suitable source of fuel and air, such as a carburetor 33 or a fuel injector (not shown), connected to connector element 31. More specifically, the fuel and air intake means 11 comprises a tubular sleeve 30 which is axially slidably disposed within an intake passageway 32 extending in intermediate wall section 16. A side intake port 34 is provided for each cavity 24.

The two intake ports 34 are juxtaposed and communicate with the inner end portion of passageway 32. The throttle means comprises an inner chamfered end portion 36 and a fixed or stationary member 38 of frustoconical shape which has an outer peripheral surface 40 inclined substantially complementary to chamfered end portion 36, the juxtaposed surfaces 36 and 40 forming a restricted annular flow passage 42. This restricted passage 42 functions to effect an acceleration of flow of fuel and air which is being drawn into the working chambers as rotor 26 rotates within cavity 24 and the latter increases in volumetric size. This relatively high velocity flow of fuel and air discharges from restricted passage 42 and thereby produces turbulence in the area 44 between the discharge end of passage 42 and each of the side intake ports 34. This turbulent flow in area 44 comminutes or disintegrates a substantial amount of the entrained droplets of liquid fuel and thereby effects vaporization of such liquid fuel. Also, such high velocity flow entrains or re-entrains fuel particles which cling to the walls of passageway 32. Thus a fuel and air mixture which is thoroughly mixed and vaporized is provided in the working chambers through intake ports 34.

As shown, flow passage 42 is annular in cross section and an actuating means is provided for axially moving sleeve 30 within passageway 32 relative to stationary member 38 so that the flow area of restricted passage 42 can be varied for regulating engine speed. In FIG. 2 sleeve 30 is shown in a position where restricted passage 42 (throttle gap) is about one-half open whereas FIG. 1 shows sleeve 30 positioned so that restricted passage 42 is substantially closed. This actuating means may be in the form of a driver arm 50 which extends through a slot 52 in connector element 31 and is connected directly or indirectly to a speed control lever or pedal actuator (not shown). The slot 52 guides arm 50 in its movement. To prevent leakage of fuel and/or air from passageway 32 through slot 52 or admixture of combustion products from the working chambers with the fresh fuel and air in passageway 32, annular seals 56 are disposed adjacent opposite sides of slot 52 in the interstices between passageway 32 and the outer surface of sleeve 30. This variable, annular restricted passage 42 or throttle gap insures a uniform distribution of the supply of fuel and air mixture to the side intake ports 34 for the various linear adjustments of sleeve 30. Furthermore, with the sleeve 30 positioned in the full open position, there is no obstruction to flow as occurs in the conventional throttle-flap control or butterfly valve arrangement where the pivot axle of the plate valve extends across the flow area. While fuel and air intake means 11 is shown and described in association with two side intake ports 34, it is to be understood that a fuel and air intake means 11 may be employed for but one side intake port without departure from the scope and spirit of this invention.

It is believed that the present invention herein described provides an improved side intake means for a rotary internal combustion engine which provides an improved combustible mixture passing into the working chambers of the engine. It is a side intake means which provides a variable throttle gap which does not, in the fully open position, present any obstruction to flow.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. An improved fuel and air intake assembly for a rotary internal combustion engine having a housing forming at least one cavity within which a rotor is supported for planetary movement and which rotor defines with the housing a plurality of working chambers which successively expand and contract in volumetric size as the rotor rotates within said cavity, the fuel and air intake assembly comprising:
   a. a side intake port means in the housing;
   b. an intake passageway in the housing communicating at one end with said side intake port means and at the opposite end with a source of combustible gaseous mixture;
   c. a variable throttle-valve means disposed upstream of said side intake port means and in relatively close spaced relation to said side intake port means;

d. said throttle-valve means including a linearly movable open ended hollow member axially slidable within said intake passageway, a fixed member disposed to extend into one end of said hollow member to define with said one end a restricted passage to receive and accelerate said combustible gaseous mixture flowing from said source thereof to the side intake port means and an actuating means for moving said movable member relative to the fixed member to vary the size of the flow area of the restricted passage.

2. The apparatus of claim 1 wherein said fixed member and said linearly movable member each have portions which coact to define a restricted passage which is substantially annular in cross-section.

3. The apparatus of claim 1 wherein said fixed member is frusto-conical in shape and wherein said hollow member is a tube and one end thereof is internally tapered substantially complementary to the frusto-conical surface of the fixed member.

4. The apparatus of claim 1 wherein said rotary internal combustion engine has a housing defining two cavities separated by an intermediate side wall and a rotor for each cavity and wherein said side intake port means are two juxtaposed ports in said intermediate side wall and said passageway is at least partially in said intermediate wall.

* * * * *